(12) United States Patent
Baker et al.

(10) Patent No.: US 10,735,451 B1
(45) Date of Patent: Aug. 4, 2020

(54) SYSTEMS AND METHODS FOR MAINTAINING IT INFRASTRUCTURE SECURITY AND COMPLIANCE WITH SECURITY POLICIES AND REGULATIONS

(71) Applicant: Sprint Communications Company L.P., Overland Park, KS (US)

(72) Inventors: Craig A. Baker, Bonner Springs, KS (US); Curtis L. Donnel, Springfield, VA (US); Xiaoqin Feng, Overland Park, KS (US); Alex D. Fiore, Overland Park, KS (US); Nassrolla Ali Madison, Conyers, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 291 days.

(21) Appl. No.: 15/899,367

(22) Filed: Feb. 20, 2018

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01); *H04L 63/1441* (2013.01); *H04L 63/20* (2013.01)

(58) Field of Classification Search
CPC . H04L 63/14; H04L 63/1433; H04L 63/1441; H04L 63/20; G06F 21/50–577; G06F 21/70–88
See application file for complete search history.

(56) References Cited

U.S. PATENT DOCUMENTS

| | | | | |
|---|---|---|---|---|
| 8,495,747 | B1 * | 7/2013 | Nakawatase | G06F 21/577 726/25 |
| 9,811,667 | B2 * | 11/2017 | Hugard, IV | G06F 21/577 |
| 2011/0138469 | A1 * | 6/2011 | Ye | G06F 21/577 726/25 |
| 2013/0091574 | A1 * | 4/2013 | Howes | G06Q 10/10 726/24 |
| 2014/0331277 | A1 * | 11/2014 | Frascadore | H04L 63/20 726/1 |
| 2017/0249644 | A1 * | 8/2017 | DiMaggio | G06Q 30/018 |
| 2018/0048668 | A1 * | 2/2018 | Gupta | H04L 63/1425 |
| 2019/0007447 | A1 * | 1/2019 | Barnes | H04L 63/1441 |

* cited by examiner

Primary Examiner — Kristine L Kincaid
Assistant Examiner — Shaqueal D Wade (57) ABSTRACT

Systems and methods discussed herein relate to maintaining regulatory compliance by scanning a plurality of systems of an IT infrastructure for security vulnerabilities, detecting vulnerabilities, and generating list of remediation tasks for the detected vulnerabilities. The lists generated are prioritized as to enable compliance of the various systems to internal policies and government regulations, and the system is dynamically updated. Via these systems and methods, it may be determined whether a system will be in compliance by a particular date and/or if remediation lists are regenerated with different priorities and/or group assignments.

20 Claims, 4 Drawing Sheets

SYSTEMS AND METHODS FOR MAINTAINING IT INFRASTRUCTURE SECURITY AND COMPLIANCE WITH SECURITY POLICIES AND REGULATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise compliance with government regulations may involve audits, certification, fines, and other aspects of the system designed to ensure the compliance of the enterprise by various compliance entities. This compliance may be demonstrated at scheduled predetermined intervals or at random intervals, and various compliance entities may have different compliance requirements and forms of proof prescribed for different regulations. These compliance entities may regulate cybersecurity, data privacy, quality control systems, healthcare-regulated systems, communications security, financial transaction security, and other areas where enterprises may have external business dealings or internal activities.

SUMMARY

In an embodiment, a system for computer vulnerability remediation, comprising: an application stored in a non-transitory memory of a server computer that, when executed by a processor: dynamically executes a plurality of security scans on a plurality of systems along a predetermined security scan timeline, wherein the plurality of systems comprises user equipment (UE), point-of-sale equipment, and enterprise servers. In an embodiment, the application further detects vulnerabilities based upon the security scan in at least one system of the plurality of systems, and assigns a priority to each detected vulnerability based on a plurality of information stored in a data store in communication with the application, wherein the plurality of information comprises a link between each system of the plurality of systems and at least one internal policy, external regulation or a compliance entity and a plurality of remediation timelines. Further in this embodiment, the application generates a plurality of remediation lists, wherein each remediation list comprises a plurality of remediation tasks and is associated with at least one team responsible for completion of the remediation tasks, automatically invokes, based on the plurality of remediation lists, at least one remediation task, dynamically updates the plurality of remediation lists based on the dynamic execution of the plurality of security scans and the automatic invocation of the at least one remediation task, and executes, based upon the dynamic execution of security scans, an adjustment to a predetermined security scan timeline associated with at least one system of the plurality of systems.

In an embodiment, a system for computer vulnerability remediation an application stored in a non-transitory memory of a server computer that, when executed by a processor: receives a first list of detected vulnerabilities across a plurality of systems of an IT infrastructure, wherein each detected vulnerability is associated with a system of the plurality of systems and a vulnerability type, and wherein each system of the plurality of systems is subject to regulation by a compliance entity; and determines, based upon the first list of detected vulnerabilities, an estimated timeline for compliance for each system, wherein the estimated timeline for compliance comprises a date by which each system will be in compliance with the compliance entity. In an embodiment, the application further: generates a plurality of remediation lists, wherein each remediation list generated is associated with at least one team responsible for remediation and comprises a plurality of remediation tasks; transmits the plurality of remediation lists to each associated responsible team; and receives a second list of detected vulnerabilities across the plurality of systems, wherein the second list comprises at least one detected vulnerability that was not on the first list. Furthermore in this example, the application dynamically updates the plurality of remediation lists based on the second list and based on a determination of completion of remediation tasks from the first list; and transmits the plurality of updated remediation lists to each associated responsible team.

In an embodiment, a method of computer vulnerability remediation, comprising: receiving a first list of detected security vulnerabilities across a plurality of systems of an IT infrastructure, wherein each detected security vulnerability is associated with a system of the plurality of systems and a security vulnerability type, and wherein each system of the plurality of systems is subject to at least one of an internal policy or an external regulation, wherein each external regulation is associated with a compliance entity; and determining, based upon the first list of detected security vulnerabilities, an estimated timeline for compliance for each system, wherein the estimated timeline for compliance comprises a date by which each system will be in compliance with the compliance entity. In an embodiment, the method further comprises the application generating a plurality of remediation lists, wherein each remediation list generated is associated with at least one team responsible for remediation; transmitting the plurality of remediation lists to each associated responsible team; and receiving a second list of detected security vulnerabilities across a plurality of systems of an IT infrastructure, wherein the second list comprises at least one detected security vulnerability that was not on the first list. Furthermore in this embodiment, the method comprises the application dynamically updating the plurality of remediation lists; and transmitting the plurality of updated remediation lists to each associated responsible team.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Enterprises such as telecommunications service providers may have internal IT infrastructures that are subject to numerous internal policies as well as independent security mandates, laws, rules, and regulations from what are referred to collectively herein as "compliance entities." These entities may include industry organizations and government agencies (state, federal, etc.). Compliance standards and regulations may come in forms including personal card information (PCI) rules, Sarbanes-Oxley (SOX), an IT portion of the National Security Agreement, and the Health Insurance Portability and Accountability Act (HIPAA). If an enterprise is found to be out of compliance with an internal policy or external regulation and/or does not prove compliance within a predetermined time period of a detection of a violation (system vulnerability), there may be various fines and other consequences including a loss of certification or approval that may negatively impact the enterprise's ability to provide service to its customers. The IT infrastructure may comprise computer systems of different types/functionalities, including payment transactions, internal accounting, gaming, human resources benefits, human resources recruiting, operations equipment management and maintenance, or other enterprise functions. A risk level may be associated (system risk level) with each system based on some or all of the functionalities performed by the system. This risk level may be elevated or reduced based upon the changing of system functions that may be based on the transfer of systems' equipment. For example, if a plurality of kiosks used for payment transactions are relocated and appropriated to a marketing or design choice function where no financial transactions are completed via the kiosks, the risk level of these kiosks may be lowered.

In various examples, vulnerabilities that are detected in IT infrastructures may be detected on a plurality of systems that are regulated by various compliance entities and internal policies and groups. Each vulnerability type and/or system may be associated with a remediation time period which provides a running clock from when a trigger is initiated, e.g., when the vulnerability is detected, until the vulnerability is remediated. These remediation time periods may begin in response to various triggering events as defined in internal policies, government regulations, and/or by the timing of government or notified body audits. These predetermined remediation time periods and fines/consequences may vary among and between compliance entities such as government agencies and/or notified bodies. Telecommunications service providers may own and/or maintain a large number of server computers and supported devices, the large number and the dynamic distribution of various server computers and applications executing on those computers may mean that a large number of IT professionals support those systems, sometimes in overlapping roles. Thus, it can be challenging, and therefore time-consuming, to identify and prioritize the remediation of detected vulnerabilities. This may lead to unscheduled system downtime and service interruptions for the customers, as well as increasing fines for the telecommunications service provider.

Discussed herein is an IT solution that analyzes the complexities of vulnerability detection and remediation to obtain compliance and provides a prioritized sequence of action items to each involved IT group and dynamically updates these sequenced action items based upon completion of action items on each list and dynamic detection of new vulnerabilities. This enables a maximum level of systems compliance and an increased responsiveness to vulnerability detection, leading to increased system uptime and decreased system downtime and client service interruptions.

The systems and methods discussed herein enable dynamic scanning of a plurality of systems of an IT infrastructure from which a plurality of prioritized lists are generated, each list is transmitted to and associated with at least one IT group that is responsible for a system or systems where vulnerabilities are detected. The prioritization may be based on a compliance entity or entities associated with the system or systems, for example, based on a time-to-remediation for a vulnerability or a vulnerability type where the vulnerabilities with the shortest time to remediation are prioritized over those with longer lead times. A remediation time may be the time from when a vulnerability is detected to when remediation is to be done based on the regulation, and the shortest time may be determined based upon a simplicity of a remediation and/or the remediation time and/or grace periods associated with the prescribed remediation times. In addition, the system may receive requests to determine future compliance based on an instant state and an anticipated future state of remediation of a plurality of vulnerabilities. These requests may specify a system or systems, and/or a date, and/or a compliance entity or entities. For example, a request may be received by the system for a determination as to whether a system of the enterprise will be in compliance with a PCI standard or standards by Aug. 8, 2018. The system may then determine, as described in detail below, if the enterprise's system will be in compliance by 8/8, and/or what remediation tasks or portions of tasks (steps) may be reassigned to different IT groups, within IT groups, or re-assigned priority based upon the 8/8 completion date. This may be an iterative exercise where a plurality of adjustments are made to at least one existing prioritized remediation list until the requested compliance date is achieved.

In an embodiment, an IT infrastructure may be comprised of system components that may be governed by (and thus is intended to be compliant to) multiple internal policies and external regulations, which may have varying triggers and timelines to remedy detected vulnerabilities. In one example, a first type of vulnerability is detected by the application across a dozen laptop computers, only some of which are governed by external regulations. In this example, if the shortest lead time for remediation of the vulnerabilities is from a first regulation and is 30 days, the laptops that fall under this first regulation may be prioritized for repair/remediation before laptops that have longer lead times for remediation. The various systems may be "owned" by different IT groups in the enterprise, and in some cases the systems are co-owned. This ownership may be based on team training, educational background including degrees, or length of time at the enterprise or in the IT field. For example, there may be a first group responsible for Human Resources laptops, a second group responsible for Human Resources desktops, a third group responsible for Operations manufacturing/packaging equipment including equipment made at original equipment manufacturers (OEM) as well as the laptops/desktops/kiosks used to run and maintain the equipment (as some may be accessed remotely), and a fourth group responsible for Sales mobile devices, including laptops, tablets, wearable technology, and phones. There may also be a fifth group responsible for deploying enterprise-wide patches and other remedies as well as a sixth group responsible for pushing out new and updated software to some or all of the enterprise-owned devices. Additional IT groups may be responsible for point-of-sale equipment or inside sales laptops and other computing devices, and/or the groups may be configured to support enterprise applications, external applications, middleware, security applications, data integrity applications, and other software and/or hardware of enterprise equipment. Internet-enabled devices, which may be referred to as "IOT (Internet of Things) devices" may also be part of an enterprise's infrastructure, such as printers, scanners, packaging equipment, sorting equipment, and other office or operations equipment.

In addition, the systems and methods discussed herein may recommend and enact changes in a distribution of applications on host computers based upon detected vulnerabilities and standards associated with each host computer. In one example, an application configured to scan multiple systems of an IT infrastructure may detect a plurality of defects across a system that may comprise one or more systems components, including laptops, host servers, mobile devices, and other systems. These systems may be regulated by internal policies of the enterprise that owns/maintains the IT infrastructure, and/or by federal, state, and/or local regulations which may be collectively referred to as "external" regulations since they are not set by the enterprise itself. Based upon a history of scanning and vulnerability detection, the system may learn which systems of the IT infrastructure are to be scanned along particular scanning timelines, and may map, adjust, and re-map particular systems to scanning timelines depending upon the dynamically updating vulnerability detection data. The timelines discussed herein may be based on an "elapsed time," in that a remediation timeline may be based on an amount of time that has elapsed from the detection of a vulnerability and a time-from-detection remediation window prescribed by a policy or regulation. The timelines may include one or more steps involved with remediation, and one or more IT groups, and may comprise a date range or a target date for completion. In some embodiments, if a remediation is not completed by the target date or end date of the date range, fines may be incurred.

The various systems scanned by the application to detect, prioritize, and track vulnerabilities in order to demonstrate timely compliance to both internal and external auditing bodies may thereby at least (1) detect a plurality of different types of vulnerabilities across a plurality of systems of an IT infrastructure; (2) determine what internal policies the systems with detected vulnerabilities are subject to; (3) determine what external regulations (including auditing bodies, and contractual terms) the systems with detected vulnerabilities are subject to; (4) determine a shortest lead time for response by contractual obligation, internal policy or external regulation for each detected vulnerability or across a plurality of vulnerabilities in each system; (5) map the detected vulnerabilities to the group or groups most likely to address the detected vulnerabilities; (6) generate a plurality of tasks lists and transmit to the group or groups; (7) dynamically update the task lists based on ongoing scans and remediation team updates; and (8) dynamically analyze an instant state of vulnerability repair against a compliance and/or audit date to determine future state of compliance. Thus, a single group may have a priority list of remediation tasks that is dynamically updated, for example, every X period of minutes, every hour, every X hours, every day, and so on, and each item on the priority list may comprise one or more tasks for remediation of a vulnerability or vulnerabilities on a single or multiple (related) systems. By creating these dynamically updating lists, it can be determined when a system or systems will be compliant to different internal policies and external regulations.

Figure 1:
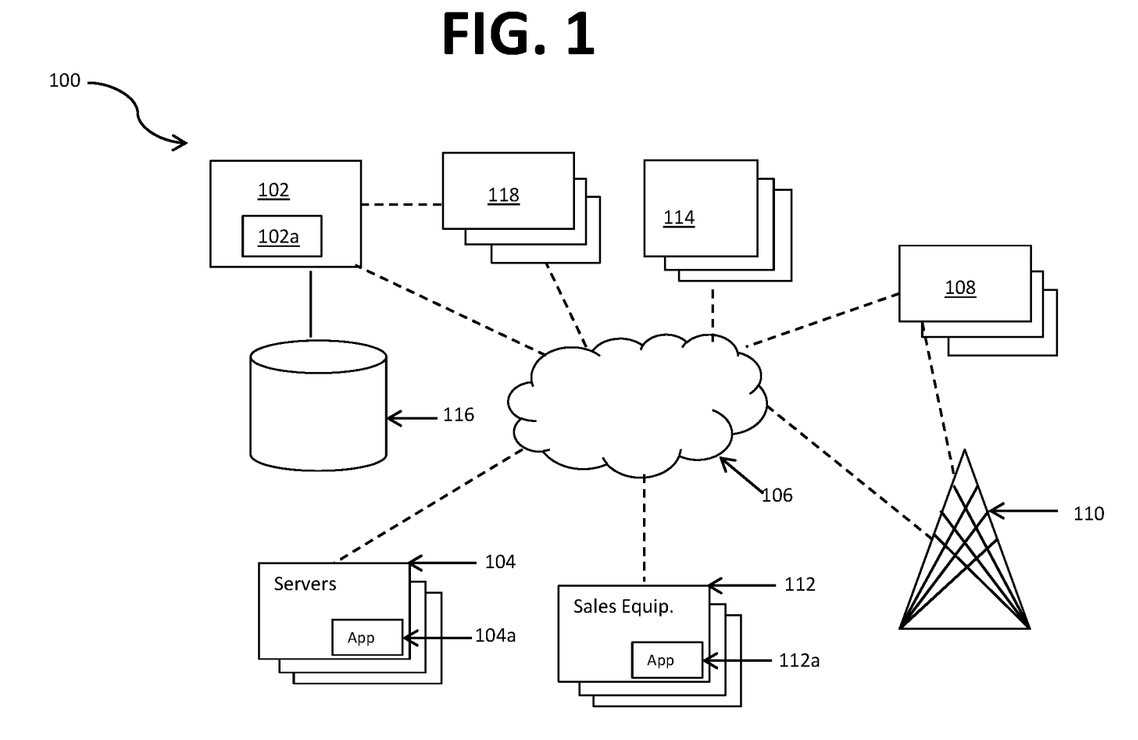
FIG. 1 is a system for maintaining compliance with internal policies and external regulations associated with system security according to embodiments of the present disclosure.

FIG. 1 is a system 100 of maintaining compliance with internal policies and external regulations associated with system security. In the system 100, a network 106 enables communication between a compliance server 102 comprising at least one compliance application 102a and a plurality of systems of an IT infrastructure. The compliance application 102a, which may comprise a suite of two or more applications, detects vulnerabilities across the IT infrastructure and dynamically updates remediation priorities based upon this detection and to target system scanning to resolve the highest number and/or criticality of detected vulnerabilities. The system 100 is configured to generate and in some cases analyze prioritized lists of vulnerability remediation tasks, assigning and re-assigning the remediation tasks or steps to IT groups based upon the training of the group(s), a resource capacity of the group(s), and a criticality based on remediation timelines of compliance entities for the vulnerability remediation. In an embodiment, the systems scanned may include a plurality of internet-enabled devices (IOT) 114 including printers/fax machines/scanners and other devices of employees from various enterprise groups (human resources, operations, internal sales, external sales, maintenance, etc.), a plurality of sales equipment 112 executing a sales application 112a including point-of-sale kiosks and computing equipment, and a plurality of user equipment (UE) 108. The plurality of UE 108 may comprise devices assigned to employees, contractors, or departments within the enterprise, and may include devices such as laptops, desktops, mobile phones, tablets, wearable technology, and other devices. The UE 108 may be coupled to the network 106 via a cell site 110, such as a cell tower or microcell or other wireless access point (e.g., WiFi AP).

The systems may further include a plurality of enterprise servers 104 that support the enterprise across various functional groups including Operations, Human Resources, Sales, Customer Care, and other groups. The IT infrastructure that includes the systems 114, 108, 104, and 112 is subject to a plurality of vulnerabilities that may be exploited by intentional hacking and/or that may occur as the result of updates and maintenance. Each of the systems 114, 108, 104, and 112 may be subject to one or more internal (enterprise) policies, contractual terms or external (government and industry) regulations, such that compliance with each set of, for example, SOX, PCI, and HIPAA regulations is audited by the agency or body responsible for the regulations or by bodies with the authority to perform compliance audits. In other examples, the enterprise may attest to its own compliance and these attestations may be reviewed by a compliance entity on a periodic announced or unannounced basis. The non-compliance of one or more system of an IT infrastructure may have various consequences including fines, which may be ongoing until compliance is established, as well as notifications to third parties and/or public disclosure of non-compliance either by the enterprise or by the auditing body/responsible agency.

In the system 100, a plurality of information may be stored by the enterprise on the data store(s) 116, which may be accessed by the compliance application 102a. This information may comprise (1) a link between each system of the IT infrastructure and at least one internal policy or external regulation or a compliance entity that may be associated with a plurality of internal policies and/or external regulations; (2) a schema that maps vulnerability types and/or vulnerabilities by system or system type to remediation timeline based on the internal policies and/or external regulations or compliance entity. In an example where the remediation has multiple steps, at least some of which are to be completed sequentially and/or that may be completed in tandem by one or more groups. As discussed herein, a remediation time or timeline is a time period for remediation established based on how long from the point of detection (date/time the vulnerability was detected) until remediation is complete and, in some cases, proof of remediation, is to be completed. The data store(s) 116 may additionally comprise the pluralities of contractual information and regulatory information as well as the above information so that the remediation lists generated herein are generated as to link various remediation tasks so that sequential steps/tasks are automatically identified to enable the teams to execute next steps in remediation and/or the automated execution of those tasks/steps. This enables the task owners to see the prioritization of not only the task at hand but also subsequent tasks that may be sequentially tied to a first task and/or to other sequential tasks.

For example, a SOX regulation may prescribe a 60 day time period from a particular triggering of a first vulnerability type to remediation, and a PCI regulation may prescribe a 30 day time period for remediation for a second vulnerability type. Thus, if a single system is found to have both types of vulnerabilities, a 30 day maximum remediation timeline may be prescribed such that the earlier deadline is assigned first and the enterprise's IT group that handles the second type of vulnerability may be assigned the remediation instead of or before a different team that is assigned responsibility for the first type of vulnerability (and/or the part of the system in which the first type of vulnerability occurs). Similarly, if an external regulation has a shorter remediation time period than an internal policy, the external regulation may be addressed before the internal policy. By analyzing a plurality of results of security scans, the application 102a may determine which systems experience the greatest number and/or occurrence of external, shorter lead time remediation vulnerabilities, and increase its security scanning frequency on these systems. Along similar lines, some systems of an IT infrastructure may be scanned less often. For example, systems that include inventory items that may not be active (e.g., that may not be in use) may be scanned less frequency due to a determined lesser vulnerability than those systems that are active and may use various communication platforms including wireless technology.

In an embodiment, the system 100 further comprises a plurality of IT group UE 118, these are the devices assigned to and/or used by various IT groups across the enterprise. It is to be understood that a single functional group such as Human Resources may have various sub-groups such as benefits, recruiting, retention & development, or other divisions, and that, similarly, the IT groups may be subdivided such that various sub-groups within and between the groups may have overlapping responsibilities for systems security and maintenance. When the application 102a generates and dynamically updates prioritized lists for repair, the application 102a transmits the lists to one or more IT group UE of the plurality of IT group UE devices 118

Turning back to the data store 116, the dynamically updated priority lists may be stored therein and referenced (indexed), for example, by system affected, by type of vulnerability detected, by IT group or teams involved, or otherwise stored such that the stored data may be queried against audit dates to determine if a set of remediation activities associated with compliance to an internal policy, contractual term or external regulation are complete and/or if they are targeted to be completed by a compliance date (e.g., the date set in the regulation or policy) or an audit date. It is to be appreciated that, during audits by government bodies, if there are incomplete remediation activities that have not passed a completion date prescribed by regulations, the enterprise may still be asked to provide evidence that remediation is scheduled by the completion date. That is, evidence of various forms of compliance system effectiveness, including corrective and preventive actions may be requested during an audit. In one example, a particular auditor may be tasked with providing attestations to an agency or other body at periodic intervals throughout the year that attest to the enterprise's compliance. In order to be considered in compliance with the particular set of regulations, for example, PCI regulations, each related attestation over a period, for example, one year, is to be submitted along this prescribed timeline. In some embodiments, the application 102a may additionally analyze vulnerability lists that may or may not be prioritized lists to determine if a plurality of remediation tasks associated with a system will place the system in compliance by a predetermined date, for example, a date dictated by external regulation and/or an impending audit during which compliance or a compliance plan will be requested. This is discussed in detail with reference to FIG. 3 below.

Figure 2:
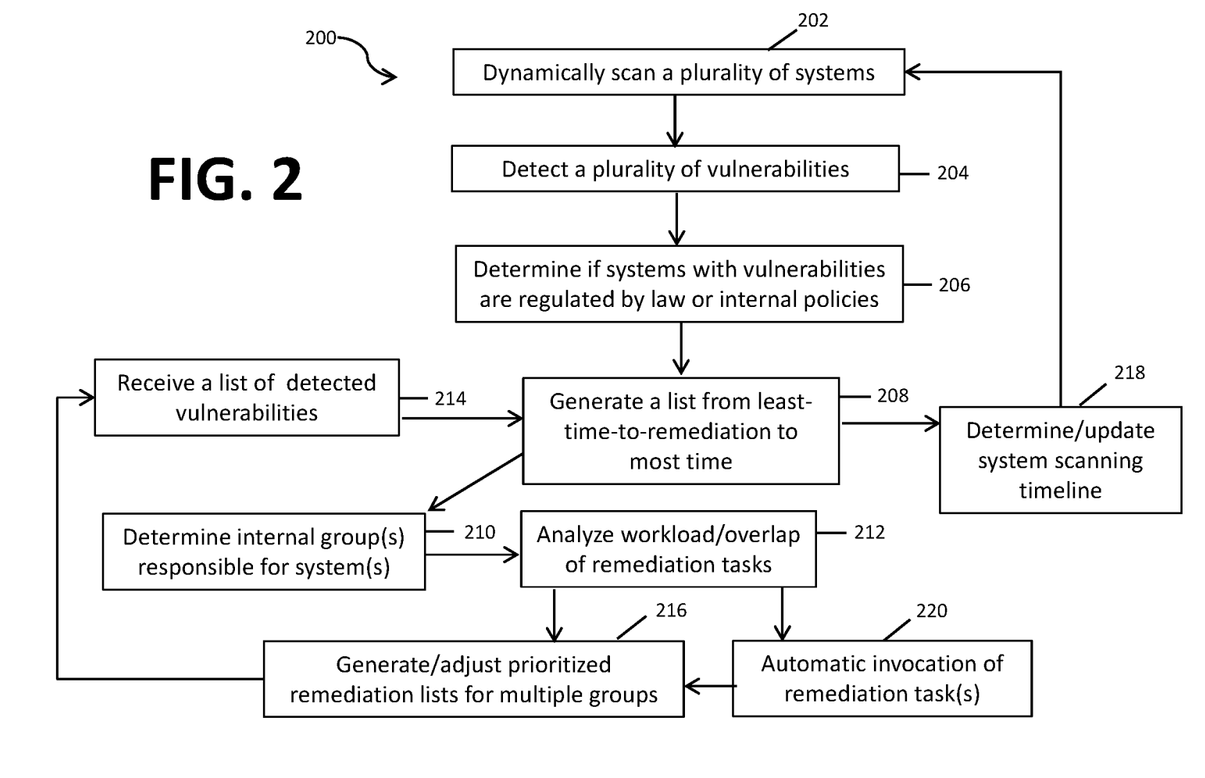
FIG. 2 is a flow chart of a method of maintaining secure IT infrastructures according to embodiments of the present disclosure.

FIG. 2 is a flow chart of a method 200 of maintaining secure IT infrastructures. In the method 200 at block 202, an application or a suite of applications dynamically executes a plurality of security scans to detect vulnerabilities across a plurality of systems of an IT infrastructure of an enterprise. These security scans may be executed at block 202 according to a plurality of scanning timelines or schedules associated with the systems. In one example, a first system may be associated with a first scanning timeline of a security scan every hour, and a second system may be associated with a second scanning timeline of a security scan every 30 minutes. At block 204, a plurality of security vulnerabilities are detected in response to the security scan on at least one system of the plurality of systems. These vulnerabilities may vary in type and may include issues and/or system components including: malware, out-of-date security version(s), firmware, third party apps, network connectivity, unauthorized access or access attempts, or other security issues that may compromise the integrity, data security, and/or operation of a system or of one or more parts of a system.

In an embodiment of the method 200, at block 206, the application or suite of applications determines if the system or systems where the vulnerabilities were detected are regulated by internal policies, contractual obligations, external regulations, or a combination of multiple regulations or policies, and/or which compliance entities are associated with the system or with a type or types of vulnerabilities detected. For example, at block 206, the system may determine that a system where vulnerabilities are detected is associated with regulations from PCI and SOX. At block 208, based upon the determination(s) at block 206, the application or suite of applications generates a remediation list. In various examples, the remediation list may comprise the vulnerabilities, the associated systems, and a remediation timeline for each vulnerability, system, or type of vulnerability, such that the remediation list is sorted by a priority of repair linked to remediation timelines in the related internal policies or external regulations.

In one embodiment, at block 218, in response to either the generation of the list at block 208 and/or the determination at block 206, the application determines if the security scanning timelines associated with each system of the plurality of systems are to be updated. For example, if system 1 gets scanned every hour but has 3× the number vulnerabilities detected as compared to system 2, which also gets scanned every hour, either the frequency of system 1's security scans will be increased, or the frequency of system 2's security scans will be decreased and the associated scanning timeline adjusted accordingly. In some examples, multiple systems' scanning timelines may be adjusted simultaneously at block 218. At block 220, a least one automatic invocation of a remediation task may occur, this automatic invocation enables a more efficient system repair and may be based on system uptime/downtime, scheduled downtime, and/or contractual agreements that may impact when various tasks are executed, where they are executed (test environments or live operations environments), or other restrictions or conditions as determined by the equipment and/or data involved in the remediation task.

The automated and dynamic adjustment of security scanning timelines based upon detected vulnerabilities enables a more efficient remediation process, leading to less downtime and/or system exposure, and may additionally lead to better technological solutions for remediation and/or a more efficient assignment of remediation tasks to teams. This more efficient remediation enables the enterprise to be in compliance and demonstrate that compliance both during internal and external audits based on the internal policies and/or external regulations. Furthermore, the systems and method discussed herein improve remediation of security vulnerabilities and systems operation because scheduled deadlines dictated by internal policies or external regulations that may have been missed using conventional methods, thus leading to fines and potentially compromised service.

In an embodiment, a first system may be regulated by three different external regulations, SOX, PCI, and the National Security Agreement, and 2 internal policies. The application may determine which of the vulnerabilities detected on the system is associated with the shortest detection-to-remediation timeline based on the regulations and policies that govern the system's regulation, and prioritize the list based upon the shortest timeline, the largest financial responsibility, the availability of a team or teams responsible for remediation, a number of steps in the remediation, which internal policies, external regulations, and/or compliance entities are associated with the system, and whether more than one team has overlapping responsibilities for the system, or other factors. In this example, if the PCI-related vulnerabilities have the shortest prescribed remediation time based upon the stored information retrieved by the system, those remediation tasks may be prioritized above tasks associated with SOX or the National Security Agreement. In another example, if PCI and SOX-related vulnerabilities have the same or substantially similar prescribed remediation times, the remediation may be assigned to different IT groups or different sub-groups within a single IT group in order to encourage simultaneous or near-simultaneous remediation.

In some embodiments of the method 200, at block 210, based on the list generated at block 208, the application determines the internal (e.g., IT) groups that are responsible for each system where vulnerabilities are detected at block 204. Further in an embodiment of the method 200, at block 212, the application analyzes a workload and/or staffing of each IT group identified at block 210. Based on this analysis, one or more prioritized remediation lists are generated at block 216 and transmitted to at least one device associated with the IT group or groups assigned to the prioritized list(s) for display on the devices or devices. These lists may be generated at block 216 in various formats, and may use not only the order of the tasks to establish priority, but may also employ a color system where a first color (e.g., red) indicates the most critical tasks and a second color (e.g., yellow) indicates less critical tasks, where the criticality is based on the compliance entity, vulnerability type, and other factors as discussed herein.

With respect to generating the prioritized lists by IT group at block 216, in some examples, a remediation task for a vulnerability on a system that is tied to two or more agency/body mandates may be prioritized over a remediation task for a vulnerability on a system that is tied to one, and a remediation task that remedies two or more detected vulnerabilities may be prioritized over a different remediation task that remedies one vulnerability. The prioritization may also take into account the remediation timeframe associated with remediating each vulnerability. That is, action items with shorter lead times to non-compliance consequences and/or system downtime/service interruption may be prioritized over those with longer lead times based upon which agency or body the remediation is associated with. In some examples, multiple IT groups may be cross-trained, and the prioritization process at least at blocks 208, 210, 212, and 216 may further comprise assignment of an action item to an IT group based upon a dynamic assessment of its current and/or projected workloads. In some examples, a single action item may be assigned to multiple IT groups with varying priority based upon the training of that group and the workloads of other IT groups. The remediation lists generated at block 216 may be generated iteratively as parts of remediation tasks or entire tasks are completed, this enables driving day-to-day priorities of teams as well as forecasting manpower availability. The remediation lists generated and/or revised at block 216 may comprise information such as targeted due dates and/or color coding to reflect the status and/or priority of tasks.

In an embodiment, the analysis at block 212 may include a determination of overlapping responsibilities for a single system, such that a first IT group that is trained to remedy 60% of a system's vulnerabilities may be assigned those tasks even if some or most of those remediation tasks overlap with a second group's technical training. In this example, the affected system may be repaired by at least the first and second groups. In another example, if the application determines, based on other stored remediation task lists previously generated, that the first group may not have the capacity to remedy some or all of those 60% of the vulnerabilities, some or all of those tasks may be assigned to the second IT group. This may be the case where, for example, the remediation involves a series of steps, some of which are to be executed sequentially, especially if tasks for the remediation of a single vulnerability or type of vulnerability on the system are able to be assigned to different groups.

Depending upon the workload of each qualified/responsible group, entire remediation tasks or portions (steps) of the remediation tasks may be assigned to a single IT group. Regardless of the IT group or groups to which a task is assigned, the responsible group provides electronic updates, which may be automatically generated as a remediation task or step is completed, such that the application is able to adjust the prioritized lists at block 216. In some examples, lists with overlapping assignments of tasks may be generated at block 216 for different teams, but the remediation tasks may be prioritized differently on some or all of those lists generated.

In one embodiment, subsequent to the generation and transmission of lists at block 216, updated lists are received at block 214 based upon remediation task or step completion updates as detected by the application or suite of applications. As each remediation task or step is completed, the completion is recorded and may be accessed during some or part of the method 200 in subsequent iterations of the method 200. In some embodiments, blocks 214, 208, 210, 212, and 216 may occur based upon a list of detected vulnerabilities that is received by the system from an outside system. When this list is received at block 214, it may then be sorted at block 208 to prioritize the list prior to determining the associated internal groups at block 210 and analyzing those groups' workloads at block 212. In this example, at block 216, the list or lists generated that prioritize remediation tasks for each IT group may be different than the list received at block 214, which may or may not have been prioritized, or which may have been re-prioritized based on, for example, workloads and/or overlap detect at block 212, as well as the completion of tasks on the original list from block 214. In other examples, tasks from the list received at 214 may have been reassigned, in whole or in part, to different IT groups based on some or all of the factors discussed above.

Figure 3:
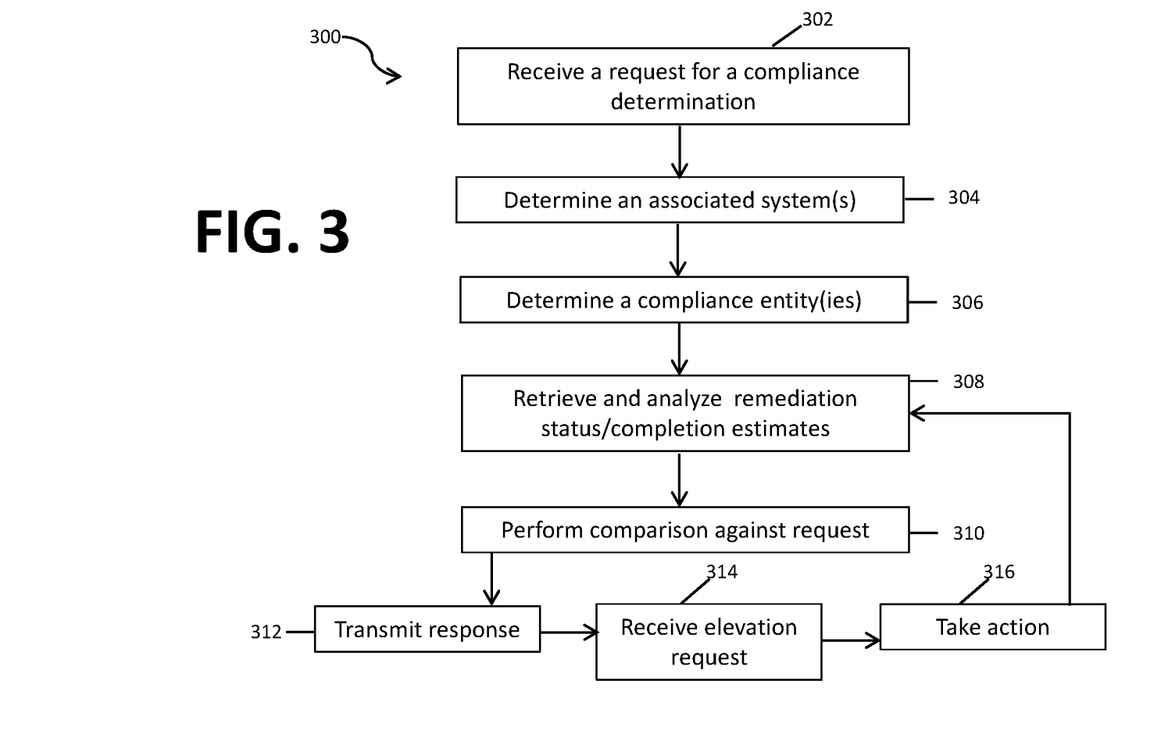
FIG. 3 is a flow chart of a method of analyzing compliance requests and adjusting prioritization lists and remediation task assignments to maintain secure IT infrastructures according to embodiments of the present disclosure.

FIG. 3 is a flowchart of a method 300 of analyzing compliance requests and adjusting prioritization lists and remediation task assignments to maintain secure IT infrastructures according to embodiments of the present disclosure. In an embodiment of the method 300, a request is received by an application such as the application 102*a* in FIG. 1. The request may be sent from, for example, a quality or regulatory assurance group that is internal to the enterprise, or by anyone with access and/or authorization to send a request. In other examples, the request may be received at block 302 according to a predetermined schedule, for example, to determine on a weekly, monthly, quarterly, or other basis as determined by internal policy or external regulation.

The request received at block 302 may comprise a plurality of detected vulnerabilities, a task or tasks associated with remediation of each vulnerability, or one or more IT groups associated with remediation, these vulnerabilities may be associated with unique identifiers. In some embodiments, the request may additionally comprise at least one compliance entity (and/or for an internal policy or external regulation associated with the at least one compliance entity) associated with the system or systems where the vulnerabilities were detected. In some examples, the list received at block 302 may comprise vulnerabilities detected across a single system, across multiple systems and multiple IT groups, for a single system and a single IT group, or for a portion of a system or systems and one or more IT groups. The request is received at block 302, in some examples, to determine if a system or systems will be in compliance with a given regulation, policy, or compliance entity (and thus a suite of regulations or policies) by a given date. Thus, in this example, the request may further comprise one or more dates and may also specify a compliance entity if multiple entities are associated with the system or systems of the request. The plurality of unique identifiers assigned to each detected vulnerability are used to track the remediation progress of the remediation task and/or steps within the task.

At block 304, the application may confirm or determine a system or systems associated with the request, and, at block 306, based on this determination, a compliance entity or entities associated with the system(s) in the request are determined if none are listed in the request. At block 308, the application may retrieve and analyze, based on the unique identifiers, a status associated with each task or step of a task. This information may be retrieved from a data store such as the data store 116 in FIG. 1. This stored and dynamically updated status may comprise whether or not the remediation is complete, in-progress, not yet started, or on hold, as well as a reason for the hold, and may also contain a target completion date if the remediation task or step is not complete at the time of inquiry at block 308. Based upon the analysis at block 308, at block 310, the application executes a comparison of the completion date in the request against the completion dates of the remediation tasks and steps to determine, for either each system or the request or for each compliance entity, if the system will be in compliance by the request date and/or if all systems associated with a particular compliance entity will be in compliance on the request date.

At block 312, a response is transmitted to the requestor based on the comparison at block 310. In some embodiments, based on the response, an elevation request may be received at block 314 from the requestor, and subsequent actions may be executed at block 316. These actions may include reassignment of all or part of a remediation task to a different IT group. In some examples, the retrieval and analysis at block 308, the comparison at block 310, and the transmission at block 312 are repeated, at least because this is a dynamic system and the completion of steps and tasks is updated as those are completed. In some examples, blocks 314 and 316 may also be repeated, and this loop from block 316 to 308 may be repeated until actions are taken at block 316 that bring the system or systems of the request received at block 302 into compliance by the requested date.

Figure 4:
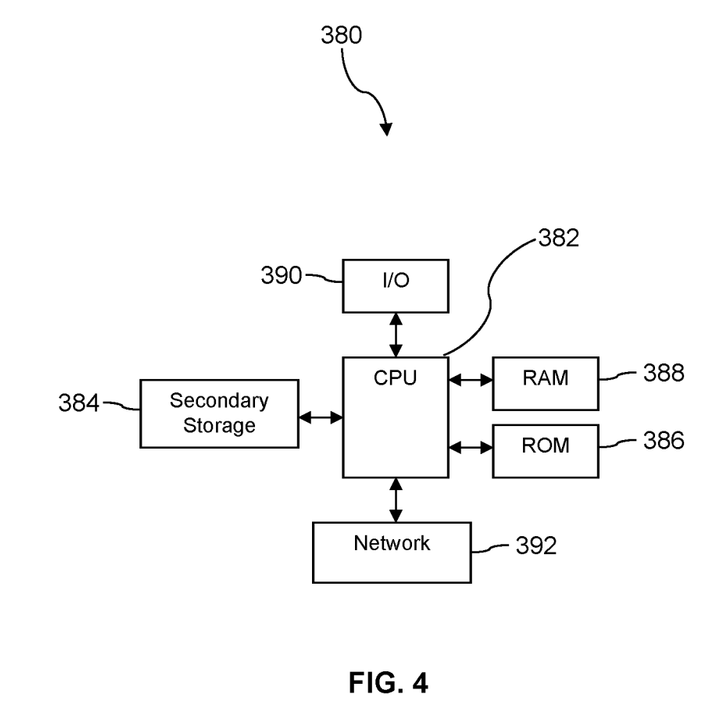
FIG. 4 illustrates a computer system suitable for implementing one or more embodiments disclosed herein.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for computer vulnerability remediation, comprising:
    an application stored in a non-transitory memory of a server computer that, when executed by a processor:
        dynamically executes a plurality of security scans on a plurality of systems along a predetermined security scan timeline, wherein the plurality of systems comprises user equipment (UE), point-of-sale equipment, internet-enabled devices, and enterprise servers,
        detects vulnerabilities based upon the security scan in at least one system of the plurality of systems,
        assigns a priority to each detected vulnerability based on a plurality of information stored in a data store in communication with the application, wherein the plurality of information comprises a link between each system of the plurality of systems and at least one internal policy, external regulation or a compliance entity and a plurality of remediation timelines,
        generates a plurality of prioritized remediation lists, wherein each remediation list comprises a plurality of remediation tasks and is associated with at least one team responsible for completion of the remediation tasks, wherein the plurality of remediation tasks in each prioritized remediation list is prioritized based on how quickly a corresponding vulnerability needs to be remediated for compliance with at least one corresponding internal policy or external regulation,
        automatically invokes, based on the plurality of remediation lists, at least one remediation task,
        dynamically updates the plurality of remediation lists based on the dynamic execution of the plurality of security scans and the automatic invocation of the at least one remediation task, and
        executes, based upon the dynamic execution of security scans, an adjustment to a predetermined security scan timeline associated with at least one system of the plurality of systems.

2. The system of claim 1, wherein each system of the plurality of systems is associated with a predetermined security scan timeline, wherein each predetermined scan timeline comprises a time range between successive security scans, a plurality of system components scanned or a type of security vulnerabilities scanned.

3. The system of claim 2, wherein the plurality of system components to scan is less than all of a plurality of components of the system.

4. The system of claim 2, wherein the adjustment comprises shortening a time range between successive security scans, increasing a time range between successive security scans, adding security vulnerability types scanned, or removing security vulnerability types scanned.

5. The system of claim 2, wherein the adjustment comprises adding or removing system components scanned.

6. The system of claim 1, wherein the priority is associated with the remediation timeline, wherein the remediation timeline is associated with a vulnerability type, a compliance entity, or a system function.

7. The system of claim 1, wherein the UE comprises one or more of laptops, desktop computers, personal digital assistants (PDA), mobile phones, wearable technology, or tablets.

8. A system for computer vulnerability remediation, comprising:
an application stored in a non-transitory memory of a server computer that, when executed by a processor:
receives a first list of detected vulnerabilities across a plurality of systems of an IT infrastructure, wherein each detected vulnerability is associated with a system of the plurality of systems and a vulnerability type, and wherein each system of the plurality of systems is subject to regulation by a compliance entity;
determines, based upon the first list of detected vulnerabilities, an estimated timeline for compliance for each system, wherein the estimated timeline for compliance comprises a date by which each system will be in compliance with the compliance entity;
generates a plurality of prioritized remediation lists, wherein each remediation list generated is associated with at least one team responsible for remediation and comprises a plurality of remediation tasks, and wherein the plurality of remediation tasks in each prioritized remediation list is prioritized based on how quickly a corresponding vulnerability needs to be remediated for compliance with at least one corresponding internal policy or external regulation;
transmits the plurality of prioritized remediation lists to each associated responsible team;
receives a second list of detected vulnerabilities across the plurality of systems, wherein the second list comprises at least one detected vulnerability that was not on the first list;
dynamically updates the plurality of prioritized remediation lists based on the second list and based on a determination of completion of remediation tasks from the first list; and
transmits the plurality of updated prioritized remediation lists to each associated responsible team.

9. The system of claim 8, wherein the first list of detected vulnerabilities comprises a prioritized list for remediation of the detected vulnerabilities, wherein the prioritization is based on the system where the vulnerability was detected, a compliance entity associated with the system where the vulnerability was detected, a team associated with the system, a team associated with a vulnerability type, and a system risk level.

10. The system of claim 8, further comprising a data store in communication with the application, wherein the data store comprises vulnerability types, system functions, and compliance entities.

11. The system of claim 10, wherein the data store further comprises a plurality of mappings between each system of the plurality of systems and at least one compliance entity.

12. The system of claim 10, wherein the data store comprises a schema that maps a vulnerability type to a remediation time, wherein the remediation time is calculated from a point of detection of the vulnerability to the point at which the detected vulnerability is remediated.

13. A method of computer vulnerability remediation by an application stored in a non-transitory memory of a server and executable by a processor, comprising:
receiving a first list of detected security vulnerabilities across a plurality of systems of an IT infrastructure, wherein each detected security vulnerability is associated with a system of the plurality of systems and a security vulnerability type, and wherein each system of the plurality of systems is subject to at least one of an internal policy or an external regulation, wherein each external regulation is associated with a compliance entity;
determining, based upon the first list of detected security vulnerabilities, an estimated timeline for compliance for each system, wherein the estimated timeline for compliance comprises a date by which each system will be in compliance with the compliance entity;
generating a plurality of prioritized remediation lists, wherein each remediation list generated is associated with at least one team responsible for remediation and comprises a plurality of remediation tasks, and wherein the plurality of remediation tasks in each prioritized remediation list is prioritized based on how quickly a corresponding vulnerability needs to be remediated for compliance with at least one corresponding internal policy or external regulation;
transmitting the plurality of prioritized remediation lists to each associated responsible team;
receiving a second list of detected security vulnerabilities across a plurality of systems of an IT infrastructure, wherein the second list comprises at least one detected security vulnerability that was not on the first list;
dynamically updating the plurality of prioritized remediation lists; and
transmitting the plurality of updated prioritized remediation lists to each associated responsible team.

14. The method of claim 13, further comprising associating a security scan timeline with each system of the plurality of systems based upon a history of security vulnerability detection for each system.

15. The method of claim 14, wherein each security scan timeline comprises a time range between successive security scans, a plurality of system components scanned or a type of security vulnerabilities scanned.

16. The method of claim 15, wherein the security scan timeline is based on at least one compliance entity associated with the system.

17. The method of claim 13, further comprising determining, based upon the receiving of at least the first and second lists of detected security vulnerabilities, an adjustment to a predetermined security scan timeline associated with at least one system of the plurality of systems; and adjusting the predetermined security scan timeline.

18. The method of claim 17, wherein the adjusting comprises: shortening a time range between successive security scans, increasing a time range between successive security scans, adding security vulnerability types scanned, or removing security vulnerability types scanned.

19. The method of claim 17, wherein the adjusting comprises adding or removing system components scanned.

20. The method of claim 17, further comprising adjusting the security scan timeline in response to a change in a system function of the system, a change in the at least one compliance entity associated with the system, wherein the change comprises an addition or a deletion of a compliance entity, or a change in a regulation of the at least one compliance entity.

* * * * *